United States Patent Office 2,969,408
Patented Jan. 24, 1961

2,969,408
PROCESS AND CATALYST FOR POLYMERIZATION OF OLEFINS

Gene Nowlin, Glen Burnie, Md., and Harold D. Lyons, Bartlesville, Okla., assignors to Phillips Petroleum Company, a corporation of Delaware No Drawing. Filed Dec. 30, 1955, Ser. No. 556,485

3 Claims. (Cl. 260—683.15)

This invention relates to the polymerization of olefinic hydrocarbons. In one aspect, this invention relates to the polymerization of olefins to form higher molecular weight unsaturated hydrocarbons. In another aspect, it relates to the polymerization of monoolefins, such as ethylene, to higher molecular weight olefins, such as butenes. In still another aspect, it relates to an improved method for polymerizing olefins and to a novel catalyst therefor.

Numerous processes for the polymerization of ethylene and other olefins to higher molecular weight olefins are described in the literature. While olefins can be polymerized by subjecting them in the absence of polymerization promoting catalysts to elevated temperatures and, in some cases, to superatmospheric pressures, the reactions are generally carried out in the presence of catalysts. In one method for converting ethylene to butene-1, a catalyst system is used which comprises triethylaluminum and collodial nickel. In this system the triethylaluminum serves as a polymerization catalyst which causes the growth of polymer chains from the ethylene. The colloidal nickel serves as a displacement catalyst which tends to stop the growth of polymer chains after the dimerization of ethylene molecules has taken place. One disadvantage of such a system arises from the fact that collodial nickel is insoluble in the reaction mediums normally employed so that the reaction mass in which the transformation of ethylene to higher molecular weight olefins takes place is a heterogeneous mass. Another difficulty which is characteristic of this catalyst system is that the collodial nickel quickly loses its displacement activity with the result that increasing amounts of higher molecular weight olefinic materials are produced as the reaction continues.

It is an object of this invention to provide an improved process for polymerizing olefins to higher molecular weight olefins.

Another object of the invention is to provide a novel catalyst system for use in the polymerization of olefins.

A further object of the invention is to provide a process for polymerizing ethylene and its homologs to form higher molecular weight monoolefins.

A still further object of the invention is to provide a process for producing alpha monoolefins.

Other and further objects and advantages of the invention will become apparent to one skilled in the art upon consideration of the following disclosure.

It has now been discovered that olefins, such as ethylene, can be polymerized to form higher molecular weight olefins, such as butenes, by employing a catalyst comprising (A) at least one of the following components: (1) an organometallic halide corresponding to the formula $R_xMX_y$, wherein R is a saturated acyclic hydrocarbon radical, a saturated cyclic hydrocarbon radical, an aromatic hydrocarbon radical, or combinations of these radicals, wherein M is a metal selected from the group consisting of aluminum, gallium, thallium, indium and beryllium, wherein X is a halogen, and wherein $x$ and $y$ are integers, the sum of $x$ and $y$ being equal to the valence of the metal, and (2) a mixture of an organic halide and at least one metal selected from the group consisting of sodium, potassium, lithium, rubidium, cesium, beryllium, magnesium, zinc, cadmium, mercury, aluminum, gallium, indium and thallium; and (B) a nickel derivative selected from the group consisting of salts of organic acids and nickel, salts of inorganic acids and nickel, and nickel organo complexes.

The organometal halide of our catalyst system can be represented by the general formula $R_xMX_y$, wherein R is a saturated acyclic hydrocarbon radical, a saturated cyclic hydrocarbon radical, an aromatic hydrocarbon radical, or combinations of these radicals such as aralkyl, alkaryl, alkylcycloalkyl, etc. wherein M is a metal selected from the group consisting of aluminum, gallium, indium, thallium and beryllium, and wherein X is a halogen. The $x$ and $y$ are integers and the sum of $x$ and $y$ is equal to the valence of the metal M. X can be any of the halogens, including chlorine, bromine, iodine and fluorine. The saturated acyclic hydrocarbon radicals, saturated cyclic hydrocarbon radicals, and aromatic hydrocarbon radicals which can be stubstituted for R in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following: $CH_3AlCl_2$, $(CH_3)_2AlCl$, $C_2H_5AlCl_2$, $(C_2H_5)_2AlCl$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), $C_{17}H_{35}BeI$, $CH_3BeBr$, 3-methylcyclohexylaluminum dichloride, 2-cyclohexylethylgallium dichloride, p-tolyberyllium iodide, di-(3-phenyl-1-methylpropyl)indium fluoride, 2-(3-isopropylcyclohexyl)ethylthallium dibromide, and the like.

Alternatively, or in addition to the $R_xMX_y$ compounds set forth above, our catalyst comprises a mixture of an organic halide and a free or elemental metal. These organic halides include chloro-, bromo-, iodo- and fluoro-substituted organic halides, and can be mono-, di-, tri- or tetra-substituted organic halides. Within the broad class of organic halides which is a component of our novel catalyst composition, the class of halides defined as monohalogen-substituted hydrocarbons having a maximum carbon chain length of not greater than 8 carbon atoms are preferred since they are more easily handled in a commercial operation and are active to initiate the polymerization of olefins in the catalyst composition of this invention. Still more desirably, the organic halide which is used in the catalyst is a lower alkyl monohalide having a maximum carbon chain length of not greater than 8 carbon atoms. Examples of these organic halides which can be used in the catalyst are ethylbromide, propyl chloride, butyl iodide and pentyl fluoride. Other examples are 1,2-dibromoethane, 1,3-dibromopropane, 1,2,3-tribromopropane, 1,2,3-trichloropropane, 1,1-difluoroethane, and 1,4-diiodobutane. Other acyclic and cyclic halides as well as aromatic halides can be employed also. Examples of these are 1,3-dichlorocyclohexane, benzyl chloride, 1,4-dichlorobenzene, 1-bromodecane, 1-chlorododecane, 2-chlorooctane, 2-chloro-4-methyloctane, cyclopentyl chloride, 1-chloro-3-phenylpropane, 1-bromo-3-phenylhexane, cyclohexyl chloride and phenyl chloride. Also, alkenyl halides, such as allyl bromide, and alkynyl halides, such as propargyl chloride, can be used. The metals which are employed in admixture with an organic halide include one or more of sodium, potassium, lithium, rubidium, cesium, beryllium, magnesium, zinc, cadmium, mercury, aluminum, gallium, indium, and thallium. The metals are usually used in the form of shavings, turnings or finely divided powder. Various mixtures or combinations of the above-mentioned organic halides and metals can be employed in the catalyst composition of this invention.

In addition to the $R_xMX_y$ compounds and/or the mixture of an organic halide and a free metal, as described hereinabove, our catalyst comprises a nickel derivative selected from the group consisting of salts of organic acids and nickel, salts of inorganic acids and nickel, and nickel organo-complexes. Examples of, but not exhaustive of, salts of organic acids and nickel, which can be used in the catalyst system of our invention, are nickel formate, nickel acetate, nickel oxalate, nickel citrate, nickel tartrate, nickel succinate, nickel cyanide, and the like. Examples of salts of inorganic acids and nickel which can be used include nickel phosphate, nickel sulfate, nickel fluoride, nickel chloride, nickel nitrate, nickel molybdate, and the like. Examples of nickel organo complexes which can be used in our catalyst system include triarylphosphine-nickel carbonyl complexes, such as triphenylphosphine-nickel carbonyl, nickel complexes with alpha-dimethyl glyoxime, nickel complexes with sodium nitroprusside, nickel complexes with aniline, nickel complexes with hydrazine thiocyanate, and the like. It is preferred to utilize the nickel organo complexes in our catalyst system since these complexes are soluble in the hydrocarbon diluent used in our process.

Among the catalyst compositions falling within this disclosure which are preferred are the following: an approximately equimolar mixture of ethylaluminum dichloride and diethylaluminum chloride and triphenylphosphine-nickel carbonyl complex; a mixture of ethyl chloride and free or elemental sodium and triphenylphosphine-nickel carbonyl complex; and approximately equimolar mixture of ethylaluminum dichloride and diethylaluminum chloride and nickel molybdate; a mixture of ethyl chloride and free or elemental aluminum and nickel molybdate; and an approximately equimolar mixture of ethylaluminum dichloride and diethylaluminum chloride and nickel chloride.

The amount of the catalyst composition of this invention which is used in the polymerization of olefins to form higher molecular weight olefinic materials can vary over a wide range. The concentration of the catalyst composition is usually in the range of 0.01 weight percent to 1.0 weight percent, although higher percentages can be used if desired. The ratio of the amounts of organometallic halide and nickel derivative will generally be in the range of 0.05 to 50 mols, preferably 0.2 to 3 mols, of the organometallic halide per mol of the nickel derivative. The ratio of the amounts or organic halide, metal and nickel derivative will usually be in the range of 0.02 to 50 mols of the organic halide per mol of the nickel derivative and from 0.02 to 50 mols of the metal per mol of the nickel derivative. A preferred ratio is from 0.2 to 3 mols of organic halide per mol of nickel derivative and from 0.2 to 3 mols of metal per mol of nickel derivative.

The process of this invention is in general applicable to the polymerization of various olefins containing a $CH_2=C<$ radical, particularly monoolefins of the ethylene series having up to and including 8 carbon atoms per molecule. The process is especially useful in the polymerization of ethylene and propylene to butenes, hexenes and higher olefins. Examples of other aliphatic 1-olefins which can be polymerized in accordance with the instant process are 1-butene, 1-hexene, 1-heptene, and 1-octene. The invention is also applicable to the copolymerization of the various relatively low boiling olefins and particularly to the copolymerization of ethylene with its homologs, e.g., propene and/or butenes. The catalyst system of this invention can also be used in the polymerization of cyclic olefins, such as cyclohexene; aryl olefins, such as styrene and alkyl-substituted styrenes; and dienes, such as 1,3-butadiene, isoprene, etc.

The polymerization in accordance with the process of this invention can be carried out at temperatures ranging from —50° F. and below to 500° F. and above. The preferred temperature range is from 50 to 300° F. A pressure from 100 to 1,000 p.s.i.g. is usually preferred although pressures as low as atmospheric and pressures above 1000 p.s.i.g. can, if desired, be employed.

In this connection, it is noted that it is preferred to carry out the reaction in the presence of an inert, organic diluent, preferably a hydrocarbon, at a pressure sufficient to maintain the diluent in the liquid phase. Suitable diluents for use in the polymerization process are paraffins, cycloparaffins and/or aromatic hydrocarbons which are relatively inert, non-deleterious and liquid under the conditions of the process. The lower molecular weight alkanes, such as propane, butane, and pentane are especially useful when the process is carried out at low temperatures. However, the higher molecular weight paraffins and cycloparaffins, such as isooctane, cyclohexane and methylcyclohexane, and aromatic diluents, such as benzene, toluene and the like, can also be used, particularly when operating at higher temperatures. Halogenated hydrocarbons, such as halogenated aromatics, halogenated paraffins, halogenated cycloparaffins and the like, are also useful as diluents. Mixtures of any two or more of the above-named diluents can also be employed in the process of this invention.

The products obtained by the process of this invention include the dimer, trimer, tetramer and higher polymers of the olefinic starting materials. For example, when ethylene is polymerized, products can be obtained which are predominantly butenes, hexenes, octenes, etc., depending upon the conditions under which the polymerization is carried out. In this regard, the polymerization can be controlled by varying the amount of nickel derivative added to the reaction mixture and/or by controlling the time of addition of the derivative to the reaction mixture. Thus, when it is desired to convert ethylene to butenes, the nickel derivative component of the catalytic system is present in the reaction mixture during the entire polymerization in a sufficient amount to stop the growth of polymer chains after the dimerization of two ethylene molecules has occurred. However, when higher molecular weight olefins such as hexenes or octenes are desired, the addition of the nickel derivative component to the reaction mixture is delayed so as to permit further growth of the polymer chains. After a desired time interval, the reaction mixture is contacted with the nickel derivative in order to stop further growth of the polymer chains. Alternatively, smaller amounts of the nickel derivative in comparison to that used in the preparation of butenes can be added initially to the reaction mixture, thereby making less of this material available for stopping the growth of polymer chains. Thus, more than two molecules of ethylene are polymerized, forming monoolefins having 6 or more carbon atoms, such as hexenes or octenes. It is to be understood that the reaction effluent will probably contain a mixture of these monoolefins, but by controlling the amount and time of addition of the nickel derivative component, a product can be obtained which is predominantly one or other of the various monoolefins.

The higher molecular weight monoolefins produced as a result of the polymerization are unsaturated in the alpha position. For example, when two molecules of ethylene are polymerized, a monoolefin having four carbon atoms per molecule is formed which is unsaturated in the alpha position. However, it has been found that the butene-1 so formed is to some extent isomerized to produce butene-2, especially when the polymerization is carried out at the higher temperatures in the above-mentioned temperature ranges. Accordingly, if it is desired to produce a product containing a high percentage of alpha-monoolefins, e.g., butene-1, hexene-1 or octene-1, it is advantageous to carry out the polymerization at a temperature in the lower end of the temperature ranges, e.g., at a temperature between 50 and 100° F.

The polymerization process of this invention can be carried out as a batch, intermittent or continuous process. In one method of operation, the catalyst components, i.e., the organometallic halides and/or the mixture of organic halide and a metal and the nickel derivative, are charged to a closed reaction vessel along with the diluent, if used. Thereafter, the olefin to be polymerized is introduced into the vessel. In another method, the organometallic halide and/or the mixture of organic halide and a metal and the diluent are initially charged to the reaction vessel after which the olefinic starting material is introduced into the vessel. After the polymerization of the olefin commences, the nickel derivative component of the catalyst is added in order to stop further growth of the polymer chains. The first of the described methods of operation is especially applicable to the dimerization of monoolefins, such as ethylene to butenes, whereas the latter method can be advantageously used to form the trimer, cotrimer, etc., of the monoolefins, such as ethylene to hexenes or octenes. The reaction products recovered from the reaction vessel can be readily treated to recover the products of polymerization which may then be further treated to recover the different polymers formed in the reaction. This operation can be accomplished by flash distillation followed by stage condensation, or by fractional distillation, or the like.

As previously noted, the process of this invention can also be carried out in a continuous manner. The residence time used in a continuous process can vary widely, since it depends to a great extent upon the temperature at which the process is carried out. The residence time also varies with the specific olefin that is polymerized and with the specific product which it is desired to obtain. Thus, the reaction monoolefin fraction predominates in alpha monoolefins when the reactants are maintained in the reaction vessel for relatively short periods of time. However, the residence time for the polymerization of olefins within the preferred temperature range of 50 to 300° F. falls within the range of one second to an hour or more. In the batch process, the times for reaction can also vary widely depending upon the specific olefin to be polymerized and upon the desired end product.

It has been found that various materials in some instances may have a tendency to contaminate the catalyst compositions of this invention. These materials include carbon dioxide, oxygen and water. Therefore, it is usually desirable to free the olefins from these materials as well as from other materials which may tend to contaminate the catalysts before contacting the olefin with the catalyst. Any of the known means for removing such contaminants can be employed. When a diluent is used in the process, this material should generally be freed of contaminants such as water, oxygen and the like. It is desirable also that air and moisture be removed from the reaction vessel before the reaction is carried out. However, in some cases small amounts of catalyst inactivating materials, such as oxygen or water, can be tolerated in the reaction mixture while still obtaining reasonably good polymerization rates. It is to be understood that the amount of such materials present in the reaction mixture shall not be sufficient to completely inactivate the catalyst.

At the completion of the polymerization reaction or when it is desired to stop this reaction, any excess olefin is vented and the contents of the reaction vessel is then treated to deactivate the catalyst, as by washing with an alcohol. The reaction products are then separated from the alcohol and diluent and treated to recover the products of the polymerization. As indicated hereinabove, this operation can be carried out by fractional distillation or by other suitable means.

A more comprehensive understanding of the invention may be obtained by referring to the following illustrative examples which are not intended, however, to be unduly limitative.

EXAMPLE I

Ethylene was polymerized in a 2700 cubic centimeter stainless steel reactor in accordance with the procedure described hereinbelow.

Four grams of ethylaluminum sesquichloride, prepared as described hereinbelow, was charged to the reactor which contained 250 cubic centimeters of benzene (dried over sodium and distilled). To this solution there was added one gram of triphenylphosphine-nickel carbonyl complex, while simultaneously flushing the reactor with purified nitrogen. The solution immediately turned black upon addition of the nickel complex. At this point the reactor was pressured with ethylene to 400 p.s.i.g., and the temperature began to rise immediately with an accompanying drop in the reactor pressure. The maximum temperature reached during the reaction was 252° F. At the end of 101 minutes, the reactor was cooled and both gas and liquid samples were taken for analysis purposes. In addition to the benzene already in the reactor, 820 grams of a liquid product was recovered. The analysis of the material recovered is presented hereinbelow in Table I.

Table I
PRODUCT ANALYSIS

| Component | Wt. percent | Grams |
|---|---|---|
| Ethane | 0.17 | 1.74 |
| Ethylene | 5.52 | 56.30 |
| Propylene | 0.02 | 0.20 |
| Propane | 0.15 | 1.53 |
| n-butane | 0.1 | 1.02 |
| Butene-1 | 8.35 | 85.30 |
| Butene-2 | 30.38 | 310.00 |
| Pentanes | 0.04 | .40 |
| Benzene | 19.55 | 200.00 |
| Hexenes and Higher | 35.72 | 365.00 |
| | 100.00 | 1,021.49 |

EXAMPLE II

Ethylene was polymerized in a reactor similar to the one utilized in Example I in accordance with the following procedure.

One gram of nickel molybdate ($\cdot 1H_2O$) was charged to the reactor containing 400 cubic centimeters of cyclohexane (dried over alumina, hydrogenated and distilled). Four cubic centimeters (4 grams) of ethylaluminum sesquichloride, prepared as described hereinbelow, was then charged to the reactor. During the charging procedure, purified nitrogen was used to flush the reactor. The reactor was then placed in a rocker and pressured with ethylene to 300 p.s.i.g. at 80° F. The reactor was then heated and the reaction started immediately with a rise in temperature and an accompanying drop in pressure. As the pressure decreased to 100 p.s.i.g., the reactor was repressured with ethylene to 300 p.s.i.g. When the pressure held steady at 300 p.s.i.g., the reactor was cooled and analyses were run on the reaction product. The maximum temperature reached during the reaction was 284° F. The total reaction time was 95 minutes, and 407 grams of liquid product, including cyclohexane, was obtained. The analysis of the liquid product recovered is presented hereinbelow in Table II.

Table II
PRODUCT ANALYSIS

| Component | Grams |
|---|---|
| C₄ hydrocarbons (butene-1 and butene-2) | 71.0 |
| C₅ non-cyclic olefins | 15.0 |
| Cyclohexane | 276.0 |
| Higher boiling olefins | 45.0 |
| | 407.0 |

Product other than cyclohexane = 407−276 = 131 grams.

$$\frac{71}{131} = 54\% \text{ C}_4 \text{ olefinic hydrocarbons}$$

$$\frac{15}{131} = 11.4\% \text{ C}_5 \text{ olefinic hydrocarbons}$$

$$\frac{45}{131} = 34.6\% \text{ Higher boiling olefins}$$

EXAMPLE III

The polymerization of ethylene was carried out in a stainless steel rocking autoclave of 2700 cubic centimeter capacity. The autoclave was charged with 500 cubic centimeters of dried benzene (dried over sodium and distilled) and 5 grams of aluminum sesquichloride prepared as described hereinbelow, while maintaining in the autoclave an atmosphere of dry nitrogen.

Ethylene was added to the autoclave until a pressure of 300 p.s.i.g. was reached, with the reactor and contents at 81° F. Heating was initiated and the temperature and pressure gradually increased over a period of one hour and 15 minutes, and at the end of that period the temperature was 320° F. and the pressure was 700 p.s.i.g. Polymerization appeared to be initiated at this point and the reactor was then pressured periodically with ethylene to maintain a pressure of about 775 p.s.i.g., and the temperature was maintained in the range of 300 to 320° F. After an additional reaction period of 15 hours and 20 minutes the temperature was recorded as 306° F. At this time the pressure was increased to 940 p.s.i.g., and this pressure was maintained for an additional 1 hour and 37 minutes, during which time the temperature varied from 304 to 311° F. At the end of this period, the addition of ethylene to the system was terminated. Unreacted ethylene was vented, and after the reactor had cooled down, methanol was added to the reaction mixture. The grease-like polymer which precipitated was separated by filtration. A yield of about 100 grams of this polymer was obtained. The ethylene used in the above examples was obtained from the Matheson Co., Inc., of Joliet, Illinois, and had a purity of 99.5 weight percent. Prior to charging to the reactors, the ethylene was passed through a purification system to remove oxygen, carbon dioxide, and water vapor. The purification system comprised an aqueous solution of pyrogallol and sodium hydroxide and a drying agent.

The mixture of diethylaluminum chloride and ethylaluminum dichloride (ethylaluminum sesquichloride) was prepared by placing 150 grams of aluminum shavings in a flask fitted with a reflux condenser and heated to about 70° C. A trace of iodine was added to the flask to act as a catalyst, and ethyl chloride was charged to the flask in liquid phase. The temperature of the reaction mixture was maintained in the range of 120 to 150° C. during the addition of the ethyl chloride, and the reaction mixture was maintained under a nitrogen atmosphere. When substantially all of the aluminum shavings had reacted with the ethyl chloride, the liquid product was removed from the flask and fractionally distilled at 4.5 millimeters of mercury pressure in a packed distillation column. The distillate, boiling at 72 to 74° C. at 4.5 millimeters of mercury pressure, was used in the catalyst compositions of Examples I, II and III in the amounts specified hereinabove. This fraction boiling at 72 to 74° C. was analyzed and found to contain 47.4 weight percent chlorine. The theoretical chlorine content for an equimolar mixture of diethylaluminum chloride and ethylaluminum dichloride is 43 weight percent.

The polymers produced in accordance with this invention are especially useful in the synthesis of various organic materials. For example, butene-1 and butene-2 can be used in the preparation of 1,3-butadiene. The polymers can also be employed in the synthesis of various other compounds, such as alcohols and glycols.

As will be evident to those skilled in the art, many modifications and variations of this invention can be practiced. Such modifications and variations are believed to come within the spirit and scope of the instant invention.

We claim:
1. A method for producing normally gaseous and liquid polymers of ethylene which comprises contacting ethylene with a catalyst consisting essentially of an approximately equimolar mixture of ethylaluminum dichloride and diethylaluminum chloride and triphenylphosphine-nickel carbonyl complex.

2. A method for producing normally gaseous and liquid polymers of ethylene which comprises contacting ethylene with a catalyst consisting essentially of an approximately equimolar mixture of diethylaluminum chloride and ethylaluminum dichloride, and triphenylphosphine-nickel carbonyl complex, in the presence of a hydrocarbon diluent, inert and liquid under conditions of the method, at a temperature in the range of 50 to 300° F., and a pressure in the range of 100 to 1000 p.s.i.g., and recovering the normally gaseous and liquid ethylene polymers so produced.

3. A catalyst composition consisting essentially of an approximately equimolar mixture of ethylaluminum dichloride and diethylaluminum chloride, and triphenylphosphine-nickel carbonyl complex.

References Cited in the file of this patent
UNITED STATES PATENTS

| | | |
|---|---|---|
| 1,793,935 | Kaufler et al. | Feb. 24, 1931 |
| 1,914,557 | Craver | June 20, 1933 |
| 2,338,428 | Mavity | Nov. 6, 1945 |
| 2,666,756 | Boyd et al. | Jan. 19, 1954 |
| 2,713,044 | McArthur | July 12, 1955 |
| 2,781,410 | Ziegler et al. | Feb. 12, 1957 |
| 2,827,447 | Nowlin et al. | Mar. 18, 1958 |
| 2,832,759 | Nowlin et al. | Apr. 20, 1958 |

FOREIGN PATENTS

| | | |
|---|---|---|
| 534,792 | Belgium | Jan. 31, 1955 |